Dec. 2, 1958 M. C. BERGER 2,862,680
HELICOPTER

Filed March 14, 1956 5 Sheets-Sheet 1

Dec. 2, 1958 — M. C. BERGER — 2,862,680
HELICOPTER
Filed March 14, 1956 — 5 Sheets-Sheet 2
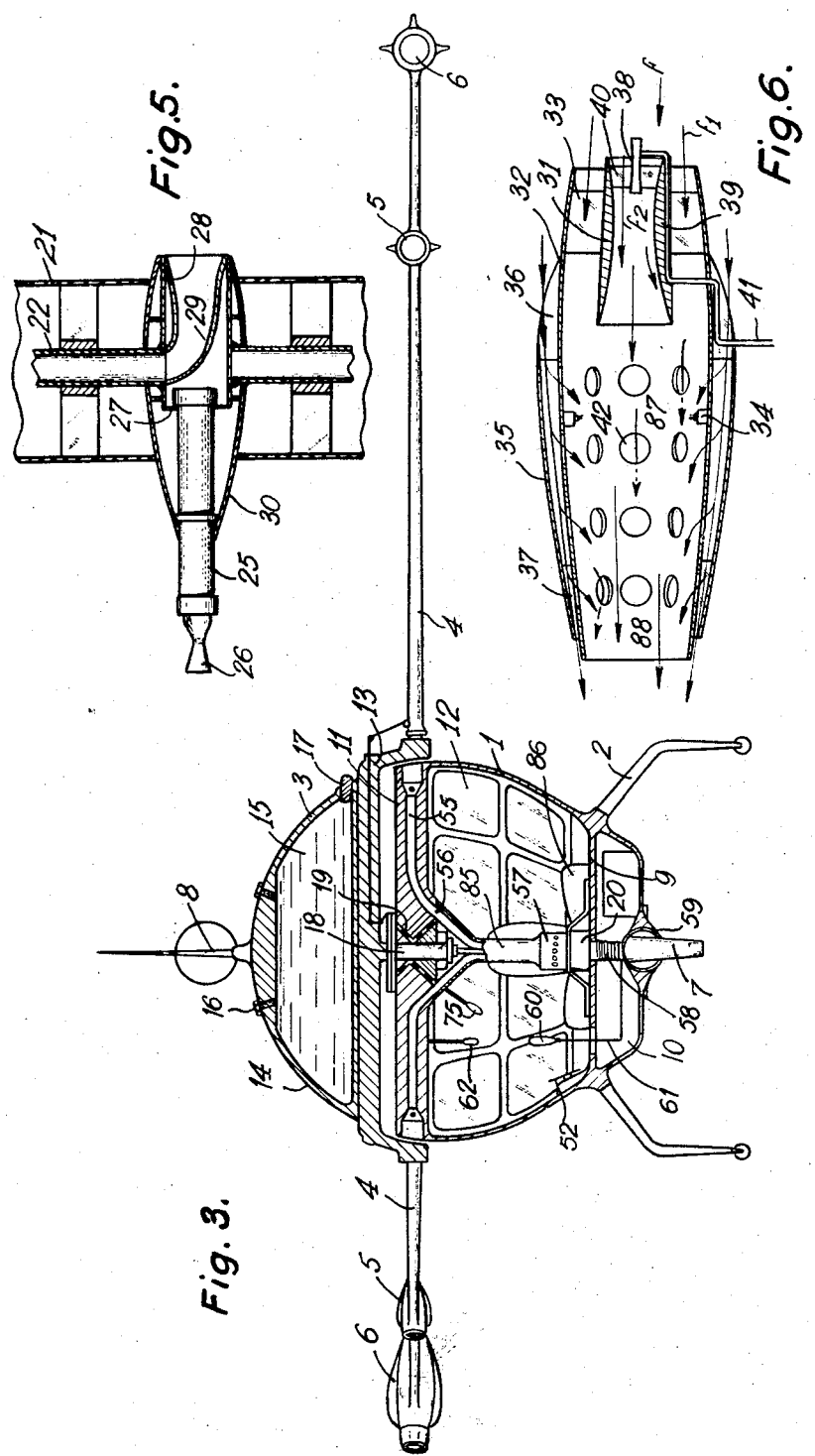

Dec. 2, 1958   M. C. BERGER   2,862,680
HELICOPTER
Filed March 14, 1956   5 Sheets-Sheet 3
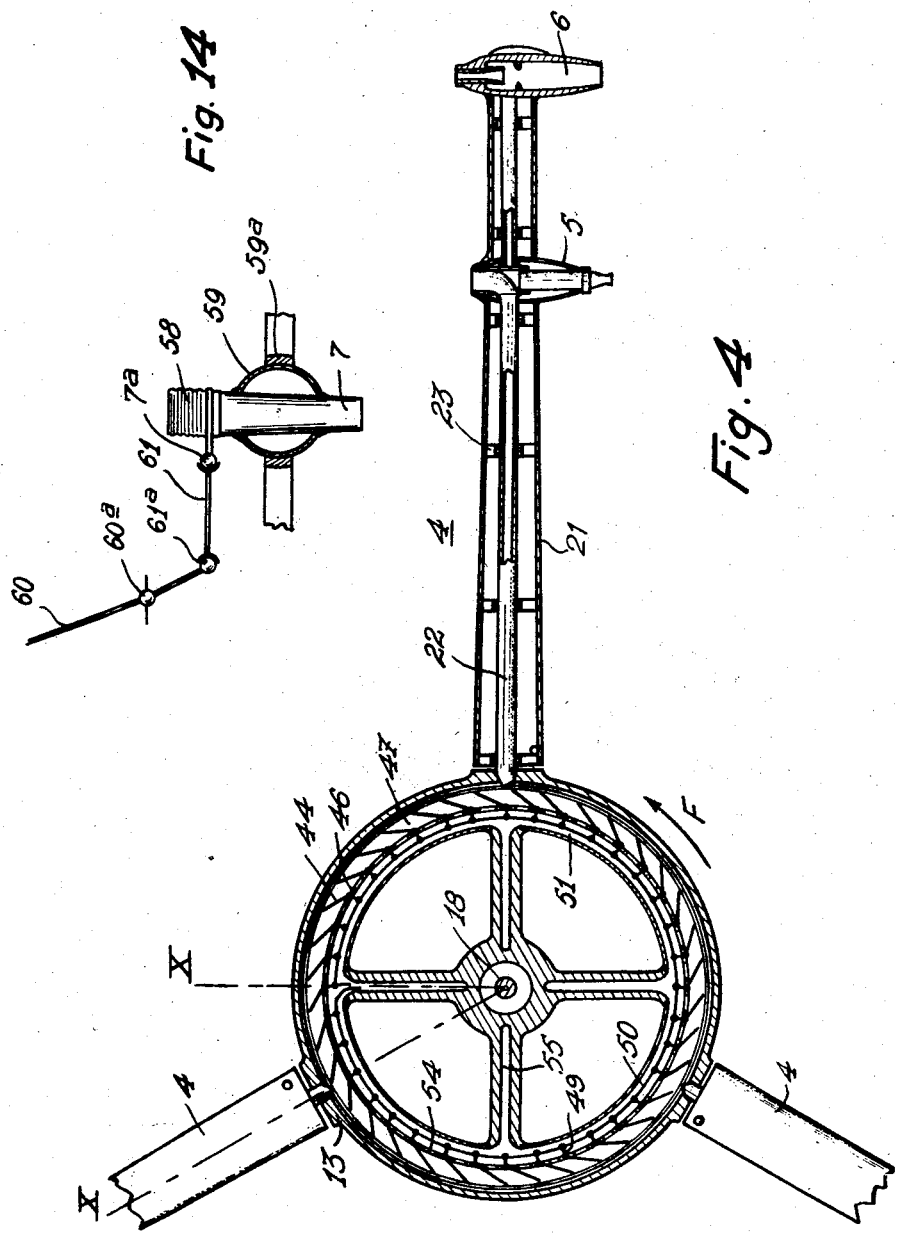

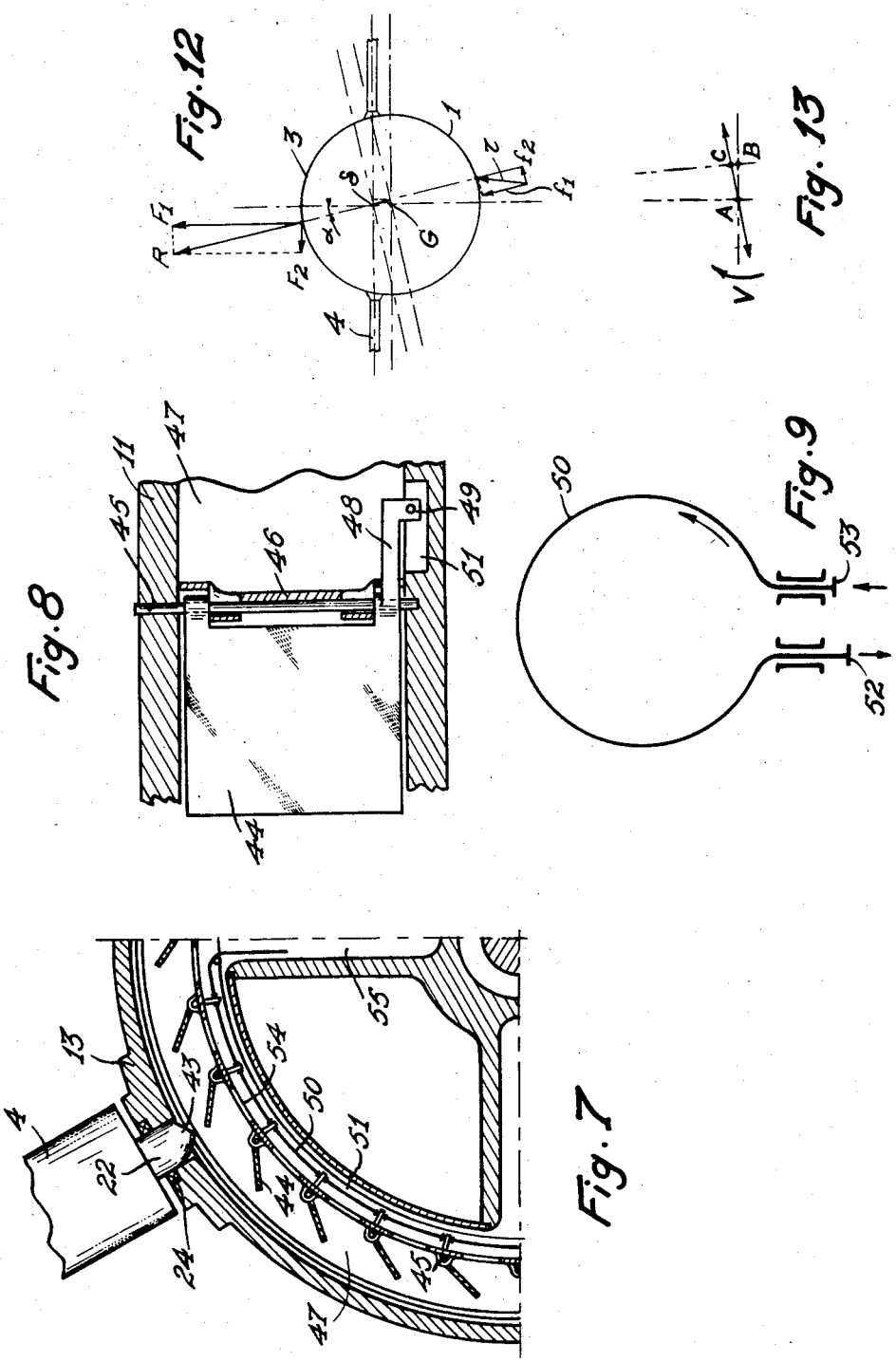

Dec. 2, 1958   M. C. BERGER   2,862,680
HELICOPTER
Filed March 14, 1956   5 Sheets-Sheet 5

United States Patent Office 2,862,680
Patented Dec. 2, 1958

2,862,680

HELICOPTER

Michel Camille Berger, Paris, France, assignor of one-fourth to Emile Auguste Bourcart, Paris, France, and one-half to Technique et Commerce, Paris, France Application March 14, 1956, Serial No. 571,456

Claims priority, application France March 17, 1955

10 Claims. (Cl. 244—17.17)

The present invention relates to an aircraft of the sustaining rotor type known under the name of helicopter.

The main object of the present invention is to provide a helicopter comprising a rotor providing both lift and thrust forces, which is rotatably mounted on a body of revolution constituting the car, a device for neutralizing the driving torque being interposed between the rotor and the body of revolution, means for varying the general pitch and the cyclical pitch of the rotor blades, and other means for imparting a transverse motion to the helicopter.

Another object of the present invention is to provide in a helicopter of the character described starting and propelling devices carried by the tips of the blades. The starting and propelling devices may consist of a starting reaction-jet associated with a separate cruising jet-propelling device. The starting device may advantageously consist of a rocket and the cruising device of a ram-jet propelling device.

Another object of the present invention is to provide a helicopter of the character described wherein the rotor support and the car consists of a spherical body divided into two portions by a horizontal plane, the upper portion forming a spherical segment on which the blades are pivotally mounted and being rotatably supported by the lower, car-forming portion through the medium of a central shaft; the landing gear is supported by the lower portion of the spherical body.

The device for neutralizing the driving torque which is disposed between the rotor and the car may advantageously consist of a circular set of adjustable deflector flaps arranged at spaced intervals in the upper portion of the car in co-planar relationship with the blade fixation devices, these flaps being adapted to be supplied with air through inlet ports disposed along the leading edges of these blades and connected to the inner ends of the rotor blades through tubes provided with converging nozzles, these tubes acting at the same time as tubular blade-spars. Preferably, the aforesaid deflector flaps are adjusted by means of a cable connected to these flaps and controlled by a rudder-bar. Thus, these deflector flaps may be adjusted at will to rotate the car in the direction of rotation of the blade rotor, or in the opposite direction, and also to hold the car stationary relative to this rotor.

The additional means for imparting a transverse motion to the helicopter consists of a jet-nozzle outwardly projecting from, and pivotally mounted on, the central portion of the bottom of the car; this jet-nozzle is adapted to be supplied with air delivered from a step-up gear and supercharger unit arranged in the car and fed in turn through air ports provided in the walls of the car between the aforesaid deflector flaps and connected through adequate ducts to said step-up gear and supercharger unit. When compressed air is ejected through this jet-nozzle a reaction force is created whereby the helicopter may be tilted both in pitching and rolling directions.

Preferably, the spherical segment constituting the rotor-blade support is used as a fuel tank and associated with a safety device to jettison this fuel through the actuation of manual or automatic release means and thus avoid any risk of fire.

In the helicopter according to the present invention the take-offs, altitude changes and landings are effected by varying simultaneously the angle of incidence of the rotor blades and their velocity of rotation, although a very short range of rotor-R. P. M. values are available.

The cruising or horizontal flight is obtained either through the cyclic-pitch variation of the rotor blades, or by altering the direction of the jet issuing from the compressed-air jet-nozzle, or by combining both means; in this last case the control inertia is reduced to a substantial extent. Moreover, it will be noted that the addition thrust provided by the aforesaid compressed-air jet-nozzle increases the lift safety and constitutes a practical and efficient easy-landing aid.

The helicopter according to this invention combines relatively high rates of climp with a good crew visibility and besides its range and endurance are considerable in cruising conditions as well as in the stationary and in vertical-flight conditions.

Further, this helicopter is characterised by a particularly sturdy and simple construction in comparison with conventional helicopters. Thus, any elaborate circuits and mechanical servo-control units such as injectors, followers, Universal joints, etc. may be dispensed with. It is much simpler to pilot than a conventional helicopter, where it only for the fact that the pilot is delivered from the constant care of keeping himself constantly ready to disconnect the rotor drive in case of break-down or slowing down. With this apparatus even if the jet-propelling devices had a failure a retarder dive will be effected and the pilot will thus be able to hold under his control at least part of the devices of the aircraft, notably those for neutralising the driving torque and the lower, compressed-air jet-nozzle.

Other features and advantages of this invention will appear as the following description proceeds with reference to the accompanying drawings forming part of this invention and illustrating diagrammatically by way of example the manner in which the invention may be carried out in the practice. In the drawings:

Figure 3 is a diametral longitudinal section of one of the rotor blades of the helicopter shown in Fig. 2.

Figure 4 is a section taken upon the line IV—IV of Fig. 3.

Figure 5 is a fragmentary section of a blade, taken across a starting jet device.

Figure 6 is a fragmentary section showing on a larger scale a rotor blade and details of the cruising jet-propelling device.

Figure 7 shows on a larger scale the deflector flaps and the control means associated therewith.

Figure 8 illustrates the mounting of a deflector flap on the car structure.

Figure 9 shows diagrammatically the common and general control of the deflector flaps.

Figures 12 and 13 are diagrams showing in vertical and horizontal planes respectively the forces acting upon the device under flying conditions, and Figure 14 shows diagrammatically the the mounting and control of the compressed-air jet-nozzle.

Figure 1:
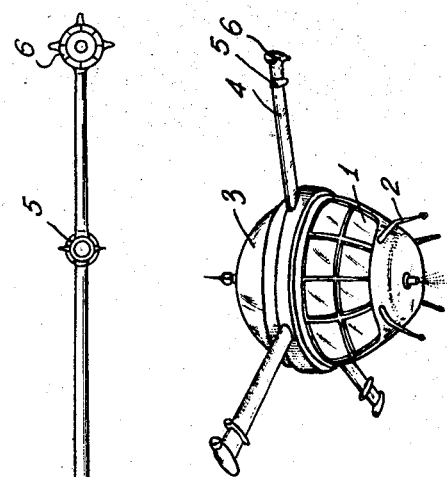
Figure 1 is a perspective view showing the helicopter of this invention when flown vertically upwards.
Figure 2:
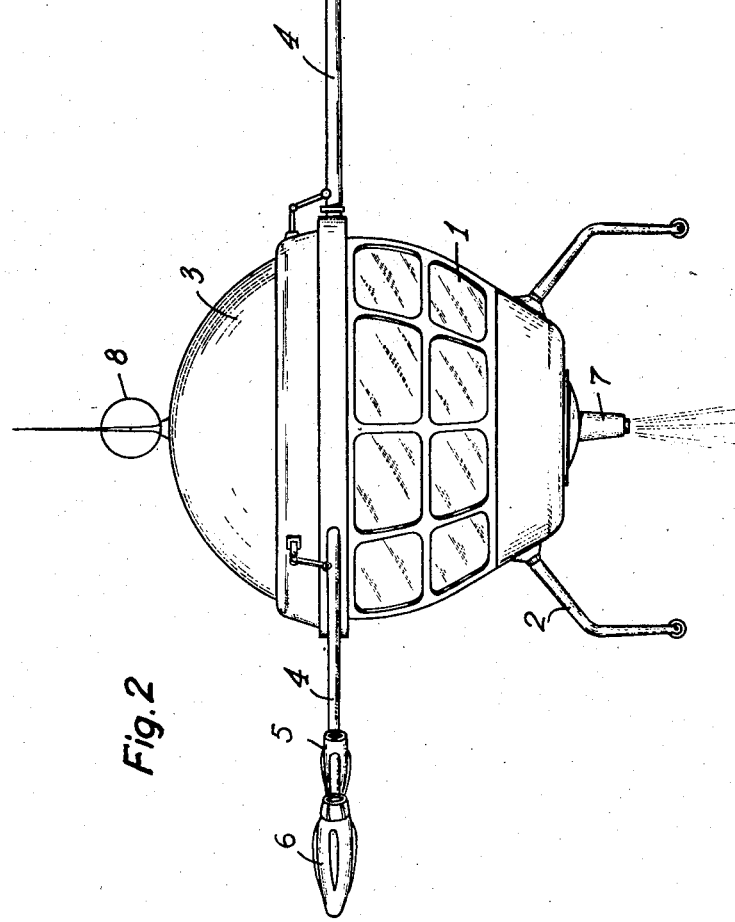
Figure 2 is a side view showing the same helicopter on a larger scale.
Figure 10:
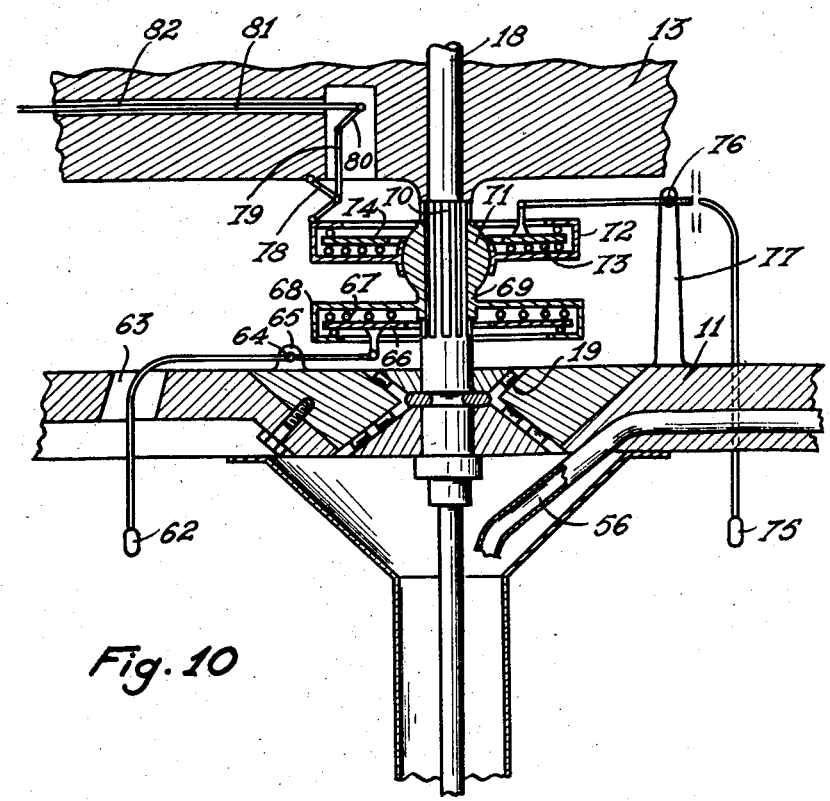
Figure 10 is a section taken upon the broken line X—X of Fig. 4 and showing on a larger scale the general-pitch and cyclic-pitch controls.
Figure 11:
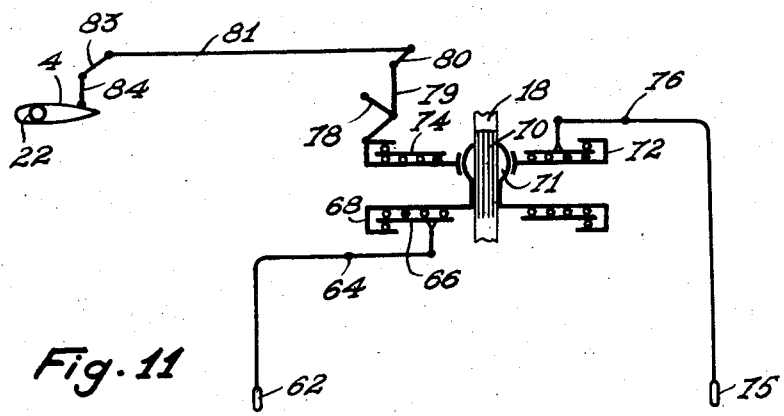
Figure 11 illustrates diagrammatically the operative connections between the general-pitch and cyclic-pitch controls and a rotor blade.

The helicopter illustrated in the various figures of the accompanying drawings is designed for a crew of four seated by pairs back-to-back. It comprises a substantially spherical assembly or body of revolution divided into two portions, a lower portion 1 constituting the car of the aircraft and supporting the landing gear made of four equally-spaced legs 2, and an upper portion 3 forming a spherical segment on which are pivotally mounted the three blades 4 of the helicopter rotor; as will be seen in Fig. 4, these rotor blades 4 are spaced 120° apart and carry directly the propelling devices consisting for each blade of a starting jet device 5 and a cruising jet-propelling device 6. The bottom of the car has mounted in its center a jet-nozzle 7 pivotally mounted for a purpose to be explained presently. Moreover, the spherical segment 3 carries a direction-finding loop 8.

The car 1 has a floor 9 providing a hollow space 10 to be used as a hold, and an upper portion or ceiling 11 bounding the cabin 12 proper.

The upper spherical segment 3 comprises a member 13 constituting a blade support and an upper member 14 bounding above this member 13 a cavity 15 serving as a fuel tank. This cavity is filled with fuel through orifices such as 16 and provided with a jettison device 17 for the rapid discharge of the fuel in an emergency. The blade supporting member 13 is rigid with a central shaft 18 extending through and supported in said car 1 by means of a pair of roller-bearings 19, 20, these roller-bearings being mounted the upper one 19 in the car ceiling and the lower one 20 in the floor 9 (see Fig. 3).

Each rotor blade 4 comprises an outer covering 21 and a central spar 22 consisting of a hollow tube connected through cross-members 23 to the covering 21. This spar is pivotally mounted on the blade support 13 through the medium of suitable bearings 24 (Fig. 7). This spar 23 acts at the same time as a support to the starting jet-device 5 and cruising jet-propelling device 6.

The starting jet-device as shown more in detail in Fig. 5 comprises a rocket 25 preferably of the solid-fuel type, consisting for example of an "SD" powder charge containing 12.2% of $N_2$ and 1% of Mg. It is ignited automatically through an igniter embedded in a black-powder relay. The chemical energy developed by the resulting reaction is converted into kinetic energy by the expansion of the gases issuing from this reaction within a convergent-divergent jet-nozzle 26. This rocket is adapted to be re-loaded several times without being removed from the blade. The charge is introduced into the combustion chamber of the rocket by screwing out the jet-nozzle 26; it is obvious that this operation may be carried out very rapidly, the spare charges being stored in the hold 10.

The rocket is mounted in a tube 27 welded to the spar-forming tube 22 and provided with a leading-edge aperture having deflector walls 28, 29 to form an air intake. The assembly is enclosed in a sheet-metal protective fairing 30.

The cruising jet-propelling device consists essentially of a wing-tip ram-jet unit 6 comprising a main inner body 31 forming a Venturi-tube with an outlet aperture larger than the inlet aperture. This body is disposed coaxially in the streamlined tunnel-like casing 32 connected to the body 31 through radial fins 33. This casing acts as a combustion chamber 87 in its portion adjacent to the outlet aperture of the body 31, the following or rear portion 88 thereof constituting a jet-nozzle 88. Peripheral ignition plugs 34 are suitably disposed in the combustion chamber 87. The central and rear portion of the casing 32 is enclosed in turn in a coxial annular outer casing 35 connected through radial fins 36, 37 to the casing 32. A smaller Venturi tube 38 of substantially cylindrical outer shape is coaxially mounted in the body 31, the rear or outlet end of this small Venturi tube 38 opening substantially in the narrowest portion 39 of the body 31 and being secured thereto through radial fins 40. The delivery end of a fuel-feed pipe 41 opens within the neck portion of the small Venturi tube 38 and the other end of the fuel feed pipe 41 is connected to the fuel tank 15; to this end, the fuel feed pipe 41 extends along the relevant blade, preferably inside the tubular spar 22. The casing 32 has a relatively large number of holes 42 formed therethrough for a purpose to be explained presently. The outer casing 35 is welded to the tubular spar 22. Thus, the Venturi tubes 31, 38 constitute a subsonic inlet diffuser which, in combination with the fuel feed in the neck portion of the smaller Venturi tube 38, is suitable for carrying out known methods of feeding fuel to jet-propelling devices.

Due to the relatively narrow gap left between the blade supporting member 13 of the spherical segment 3 and the ceiling 11 of the car 1, the latter tends to rotate and this tendency is neutralized completely or partially by the device provided for counteracting the frictional influence of the driving torque on the car 1. This device consists of air intakes provided by deflector walls 28, 29 arranged in the leading edge of the rotor blades, whereby the surrounding air may be drawn in through a convergent inlet orifice. The thus expanded air is directed through the spar-forming tubes 22 towards convergent jet-nozzles 43 mounted on the inner end of these tubes 22; these jet-nozzles 43 project the incoming air against anti-torque flaps or vanes 44. These flaps 44 are pivoted on pins 45 carried by a circular flange 46 mounted in an annular cavity 47 formed in the ceiling 11 of the car. These flaps 44 are formed with small adjustment levers 48 rigid therewith and each provided with a small hole 49 through which a control cable 50 is adapted to extend and be secured to the flaps. The adjustment levers 48 and cable 50 are received in turn in an annular cavity 51 communicating with the cavity 47. The cable 50 is provided with a flexible housing and actuated by means of a rudder bar consisting of a pair of pedals 52, 53. By actuating these pedals the pilot is thus able to alter the inclination of flaps 44 relative to the car and to create a force equal to, minor or major than, the friction torque, according to the aggregate surface of the flap assembly on which the air stream is caused to impinge as a function of their angle of incidence, so that the car may be either rotated in the same direction as the rotor, or in the opposite direction, or held stationary with respect thereto. Thus, the stability about the axis of yaw or directional stability of the car is obtained.

In the flap-carrying flange 46 orifices 54 alternate with the flaps to enable the air having impinged on the flaps to flow through four radial channels 55 formed in the ceiling structure 11 of the car 1; these channels are connected through ducts 56 to the inlet of a step-up gear and supercharger unit 57 carried by the shaft 18 so as to raise the compression ratio of this air to a relatively high value. The compressed air issuing from the step-up gear and supercharger unit 57 is directed through a flexible pipe 58 towards the swivelling jet-nozzle 7 in which the compressed air is expanded. The jet-nozzle 7 (Fig. 14) is carried by a ball member 59 universally mounted in a spherical socket 59a secured on the car. This jet-nozzle is connected through a swivel-joint 7a with a rod 61 the other end of which is connected through a socket-joint 61a with a control lever 60 universally mounted on the car floor by means of a swivel-joint 60a. With this swivelling jet-nozzle 7 it is possible, on the one hand, due to the reaction jet issuing therefrom to provide an additional lift force in take-off and landing manoeuvres, and, on the other hand, to produce a directional effect by setting the jet-nozzle 7 at an angle to the vertical. The air leaks occurring between the ceiling 11 of the car 1 and the supporting member 13 of the blade roots will constantly clean the clearance existing between these parts.

The angle of incidence of the blades 4 may be varied by means of the control device and mechanism now conventional in helicopters. The pitch-control device comprises a general-pitch control unit and a cyclic-pitch control unit.

This device comprises a general-pitch control lever 62 extending through an aperture 63 in the car ceiling 11 and pivoted at 64 on a bracket 65 secured on the aforesaid ceiling. This lever 62 is operatively connected to a plate 66 mounted for free rotation on the central shaft 18 and carrying through the medium of circular rows of balls 67 another plate 68 associated with a hub 69 formed with splines meshing with corresponding splines formed on the registering portion of shaft 18. Consequently, this assembly is adapted to slide longitudinally on the splines 70 upon actuation of the lever 62. The hub 69 has a substantially spherical upper extension 71 forming with a plate 72 a universal joint, this plate 72 receiving through the medium of a thrust ball-bearing 73 another plate 74 mounted for loose rotation relative to the shaft 18 and controlled by means of a cyclic-pitch control lever 75 extending through the ceiling 11 and pivoted at 76 on a bracket secured on this ceiling, as shown. The assembly formed by plates 72 and 74 acts as a swash-unit.

For each blade assembly, the plate 72 is connected through a linkage 78 having its arms pivoted on this plate and on the blade support 13, to a link 79 controlling in turn a crank 80 rigid with a rod 81 located in a cavity 82 formed in the blade support 13. This rod 81 has its opposite end connected to another crank 83 adapted through a link 84 to cause the blade concerned to rotate about the axis of the tubular spar 22.

This pitch-control device operates as follows:

When it is desired to produce a general-pitch variation, the lever 62 is acted upon and by pivoting about the axis 64 causes the plate 66 (which is held against rotational motion relative to the car) to move up or down, thereby moving in the same direction the plates 68 and 72 rotatably rigid with the shaft 18. This movement will open or close the linkages 78 and, therefore, the link 79 will be moved up or down and carry along, through the crank 80, the rod 81, so that the latter will rotate about its axis and move in turn the link 84 up or down, this pivoting movement of the link 81 finally causing the blade 4 to move angularly about the axis of its tubular spar 22.

To effect a cyclical pitch variation the lever 79 is pivoted about its axis 76 and this movement causes the plate 74 fixed relative to the car to be tilted about the axis 18 and, therefore, to bring about a similar inclination of the other plate 72 about this axis. The linkages 78 are open or closed by turn, according to their position on the plate 72 and this, in combination with the alternate up- and downward movement of the link 79, produces an alternate rotation of the rod 81 on itself and, consequently, an alternate beat or flapping of the blade 4 about its tubular spar 22.

As is well known to technicians, these variations in the cyclical pitch enable the helicopter to effect transverse movements in all directions. As the angle of incidence of the blades varies alternately during the flight they tilt the rotor and car assembly, thereby developing a resultant force of which the components provide the one the necessary lift and the other the horizontal flight thrust respectively.

In the car 1 the control shaft 18, pipes 56 and step-up gear and supercharger unit 57 are enclosed in a cylindrical case 85 serving as a rest to the four seats 86.

The helicopter described hereinabove is operated as follows:

The aircraft is supported by its legs 2 and before starting the rockets 25 are ignited by electrical means controlled from the car but not shown in the drawings for the sake of simplicity. In a few seconds the thrusts produced by the three blade rockets 5 actuate the rotor in the direction of the arrow F of Fig. 4, until the resulting velocity of rotation is sufficient to enable the ram jet-propelling devices 6 mounted at the blade tips to operate in turn, these ram jet-propelling devices being adapted to maintain the rotational movement of the rotor consisting of the three blades 4 pivoted on the spherical segment 3.

As a consequence of the movement of rotation of the rotor, a directional pressure parallel to the arrow $f$ of Fig. 6 develops at the inlet convergent end of each Venturi tube 31 due to the blade speed relative to the surrounding atmosphere. Due to the high pressure thus created at the convergent inlet end of the Venturi tube 38, on the one hand, and to the high vacuum developed at the divergent outlet end thereof, on the other hand, this outlet end registering substantially with the narrowest section 39 of the other Venturi tube 31, a very high vacuum is created at the neck portion of this small Venturi 38 and the fuel for cruising or normal flight is simultaneously drawn through the feed pipe 41 and forced to the neck portion of the small Venturi 38 by the centrifugal force compensating the lack of proportionality between vacuum and speed. Under these conditions the ignition circuit is switched on, and the fuel atomized by the divergent portion of the Venturi tube 31 forms a mixture with the atmospheric air forced into the jet-propulsion device in the direction of the arrows $f_1$, $f_2$, and as this mixture enters the combustion chamber 87 it is ignited by the ignition plugs 34 therein. The combustion gases are diluted by the air stream circulating between the casings 32 and 35, part of this air stream being drawn by suction into this combustion chamber 87 and into the subsequent jet-nozzle 88 across the port-holes 42 owing to the well-known suction effect connected to the velocity of the gaseous flow in the convergent portion of this nozzle. At the same time another portion of this air flows between the casings 32 and 35, thereby cooling the jet-nozzle 88. The injection of dilution air into the jet-nozzle will keep the limit layer on the walls of this nozzle.

Any unburnt gases issuing from the combustion chamber are burnt in the jet-nozzle 88 in which another ignition system may be provided, together with an additional fuel injection to momentarily increase the power output of the jet-propelling device when required. It will be noted that with this arrangement any fuel injection pumps as normally used in reaction-jet propulsion may be dispensed with since the fuel is injected by the action of vacuum created by the subsonic inlet diffuser constituted by the coaxial Venturi tubes 31, 38, in combination with the centrifugal force acting on the fuel proper.

The pilot may act upon the pedals 52, 53 to set the deflector flaps 44 either in the position holding the car stationary relative to the rotor, or in the position causing the car to rotate in the direction of motion of the rotor or in the opposite direction. The air issuing from the annular chamber 47 in which it has acted upon the flaps 44 flows through the ports 54 and is lead by the ducts 55 and pipes 56 to the step-up gear and supercharger unit 57 which delivers it to the swivelling jet-nozzle 7. This step-up gear and supercharger unit 57 is adapted to supply kinetic energy to the air stream initially introduced in the apparatus, as this air has undergone a loss of energy through the positive and negative frictions with the deflector flaps 44. However, the supercharger incorporated in this unit is of relatively moderate power since the dynamic pressure available at its inlet is still quite appreciable.

When the pilot wants to take off, change the aircraft altitude vertically and land, he actuates the lever 62 controlling the general pitch of blades 4, and the lever 60 controlling the jet-nozzle 7 so as to slightly incline it as explained hereafter.

To effect a manoeuvre the pilot actuates the cyclic-pitch control lever 75 or the lever 60 controlling the direction of the jet-nozzle 7 to give a greater inclination thereto relative to the vertical; he may also act simultaneously on both levers 60, 75. It is also possible to control the swivelling jet-nozzle 7 and the cyclical pitch through the actuation of the lever 60 alone.

Figures 12 and 13 are diagrams illustrating the different forces developed during the helicopter manoeuvres.

The center of gravity G of the assembly is coincident with the center of the sphere and lies beneath the supporting center S of the rotor where the lift is applied to the machine in the medial plane of the rotor, in view of providing the pendular effect whereby the stability of the helicopter may be ensured in case external forces such as blasts of wind or the like acted thereon, these external forces counteracting the equilibrium which would be perfect if G and S were merged together.

When the helicopter is inclined to an angle $\alpha$ due to the variation in the cyclical pitch or to the thrust resulting from the inclination of the jet-nozzle 7, the assembly is subjected to a force R originating a lift force $F_1$ and a horizontal thrust $F_2$. In the case of an inclination in a vertical plane which results from the action of the jet of compressed air the jet thrust will provide a resultant $r$ developing a tilting force $f_2$ and a thrust force $f_1$.

During this variation, the gyroscopic torque produced by the rotor originates a backward force which is easily counteracted by displacing the compressed-air jet-nozzle 7 not in the exact direction of tilt (AB in Fig. 13) but in a direction AC inclined with respect to AB as a function of the direction of the velocity of rotation B, in order to compensate the effect resulting from this gyroscopic torque.

When the tilting effect has been obtained by proper action of the compressed-air jet-nozzle and in order to maintain the equilibrium in the new position giving the forces $f_1$ and $f_2$, it will be sufficient to reduce the thrust produced by this jet 7 or to restore the jet axis to a position very close to the apparent vertical. If the center of gravity G and the supporting center S were coincident with each other, the axis of this jet-nozzle could be merged with the apparent vertical but nevertheless it remains necessary to maintain this axis somewhat inclined to this apparent vertical in order to counteract the load effects which may be variable, thereby providing the desired and also variable pendular effect.

It is obvious that many modifications may be brought to the devices described hereinabove, without departing from the scope of the invention as defined in the appended claims.

Thus, the helicopter may be driven by providing on each blade a single ram jet-propelling device having a starting threshold corresponding to zero speed, of known type and in this case the rocket 5 may be dispensed with, the air intake being mounted in a simple fairing carried by the blade. Similarly, in the ignition system of the combustion chamber of the jet-propulsion device an electronic device may be substituted for the ignition plugs, in view of producing a large sheet of sparks and increasing the reliability of the ignition system.

Again, when the helicopter is to be flown for a relatively long time in a stationary position or vertically, or normally but with a large number of manoeuvres in the three dimensions at a relatively low cruising speed requiring but a moderate tilting of the apparatus and, consequently, a moderate reaction from the jet-nozzle 7, the step-up gear and supercharger unit may be equipped with a clutch device associated with a by pass for directly connecting the pipe 56 with the flexible pipe 58 of the swivelling jet-nozzle 7.

What I claim is:

1. A helicopter comprising a car-forming body of revolution, a support surrounding the upper portion of said body at a small distance therefrom and rotatably mounted thereon, a rotary shaft carrying said support and mounted in said body along the revolution axis thereof, a plurality of blades having a conventional airfoil section, pivotally mounted on said support and radially directed with respect to the rotation axis of said support, means on said body for counteracting the driving torque applied thereon by said support when rotating, conventional means for varying the general pitch and the cyclical pitch of the blades, additional means on said car-forming body for imparting a transverse motion to the helicopter, starting and propelling assemblies carried by said blades in the vicinity of their tips, and a landing gear supported by the lower portion of said car-forming body.

2. A helicopter, according to claim 1, wherein each starting and propelling assembly comprises a starting jet-propelling device and a separate cruising jet-propelling device.

3. A helicopter, according to claim 2, wherein each starting jet-propelling device consists of a rocket secured on the corresponding blade between the cruising jet-propelling device and the blade root in the vicinity of said cruising jet-propelling device, said rocket comprising a body adapted to receive the charge and a convergent-divergent nozzle screwed on said body.

4. A helicopter, according to claim 2, wherein each cruising jet-propelling device consists of a ram-jet engine.

5. A helicopter, according to claim 1, wherein the rotary support and the car-forming body consist of a sphere divided into two portions, the upper portion of spherical segment shape being used as a fuel tank, carrying the blades for pivoting movement and being rotatably supported by the lower car-forming portion through the medium of the rotary shaft, this lower portion supporting the landing gear.

6. A helicopter, according to claim 1, wherein the means for counteracting the driving torque applied on the car-forming body by the blade support when rotating comprises angularly adjustable deflector flaps parallel to the revolution axis of said body and disposed in a circular set within an annular open chamber machined around the upper portion of said body in the plane of fixation of the blades on the support, means for adjusting the angular setting of said deflector flaps, and, for each blade, an air intake opening on the leading edge in the vicinity of the blade tip, a tube acting as a blade spar, deflector walls connecting said air intake to said tube, and a convergent nozzle connected to the inner end of said tube and passing through the support for blowing the expanded air coming from the air intake against said deflector flaps.

7. A helicopter, according to claim 6, wherein the means for adjusting the angular setting of the deflector flaps comprises adjustment levers respectively secured on said flaps, a control cable connected to said levers, and a pair of pedals respectively connected to the ends of said control cable.

8. A helicopter, according to claim 6, wherein the additional means for imparting a transverse motion to the helicopter comprises a downwardly directed air jet-nozzle pivotally mounted on, and outwardly projecting from, the central portion of the bottom of the car-forming body, a step-up gear-supercharger unit carried by the rotary shaft and disposed in the car-forming body, a flexible pipe interconnecting the air jet-nozzle and the outlet of said unit, ducts connecting the annular open chamber to the inlet of said unit, and means for pointing said air-jet nozzle in the required direction.

9. A helicopter, according to claim 8, wherein the air jet-nozzle is carried by a ball member universally mounted in a spherical socket secured on the car-forming body.

10. A helicopter, according to claim 1, wherein the additional means for imparting a transverse motion to the helicopter comprises a downwardly directed air jet-nozzle pivotally mounted on, and outwardly projecting from, the central portion of the bottom of the car-forming body, a step-up gear-supercharger unit carried by the rotary shaft and disposed in the car-forming body, a flexible pipe interconnecting the air jet-nozzle and the outlet of said unit, ducts connecting the inlet of said unit to the ambient atmosphere, and means for pointing said air jet-nozzle in the required direction.

References Cited in the file of this patent

UNITED STATES PATENTS

| | | |
|---|---|---|
| 2,640,549 | Isacco | June 2, 1953 |
| 2,711,295 | Peterson | June 11, 1955 |
| 2,742,972 | Apostolescu | Apr. 24, 1956 |

FOREIGN PATENTS

| | | |
|---|---|---|
| 427,951 | France | Mar. 13, 1911 |
| 1,097,804 | France | Feb. 23, 1955 |